L. G. HAASE.
MOLDING MACHINE.
APPLICATION FILED JAN. 5, 1914.
1,156,358.
Patented Oct. 12, 1915.
2 SHEETS—SHEET 2.
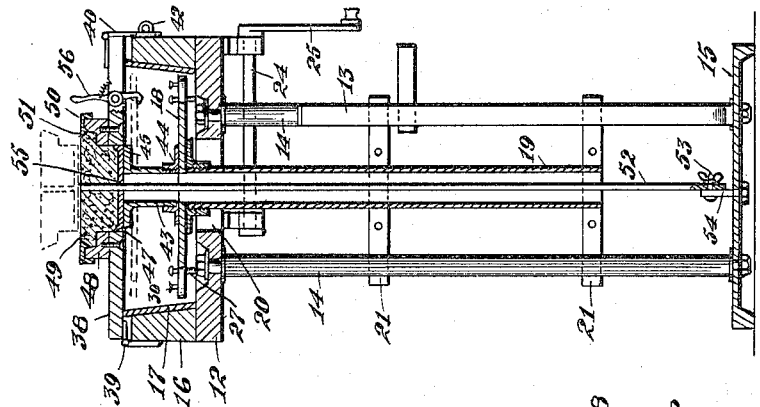
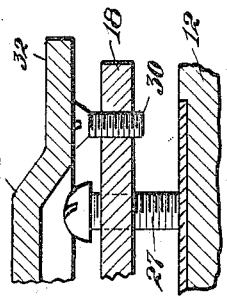
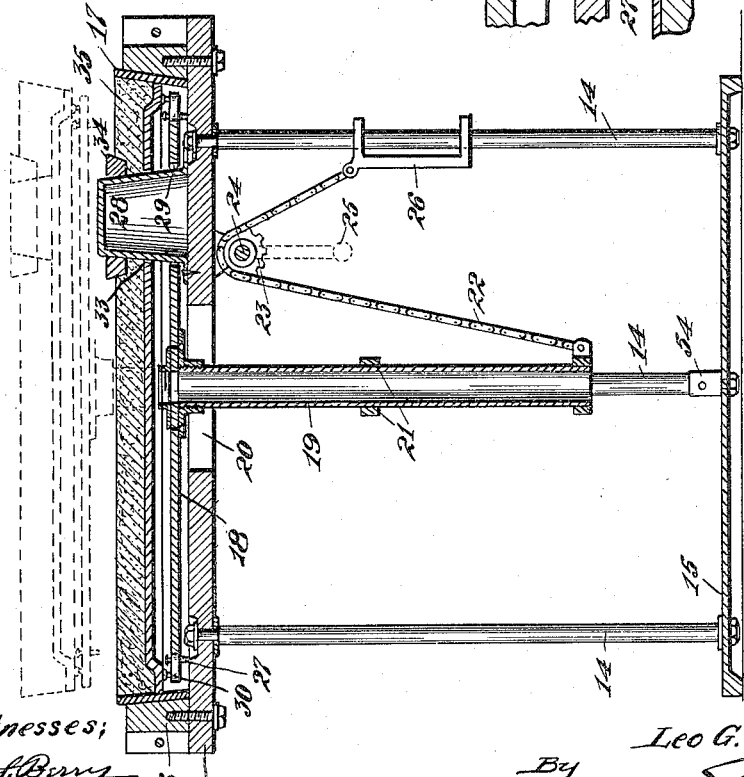
Witnesses:
R. S. Berry
Marie Battey
Inventor:
Leo G. Haase
By Hazard Strauss Attys

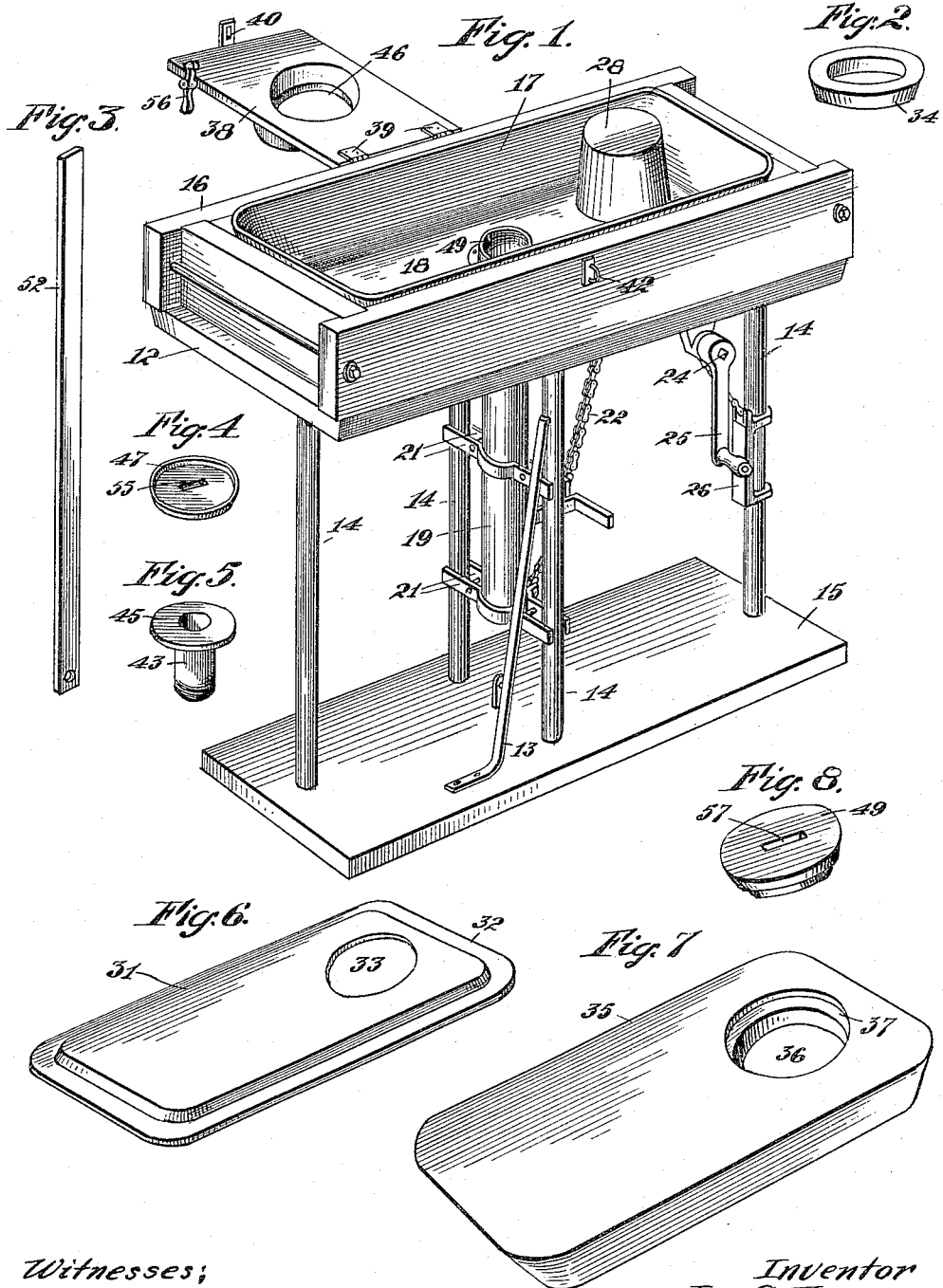

UNITED STATES PATENT OFFICE.

LEO G. HAASE, OF PASADENA, CALIFORNIA.

MOLDING-MACHINE.

1,156,358. Specification of Letters Patent. Patented Oct. 12, 1915.

Application filed January 5, 1914. Serial No. 810,325.

*To all whom it may concern:*

Be it known that I, LEO G. HAASE, a citizen of the United States, residing at Pasadena, in the county of Los Angeles, State of California, have invented new and useful Improvements in Molding-Machines, of which the following is a specification.

This invention relates to a molding machine.

It is the object of this invention to provide a machine for molding plastic materials to form meter box covers, such as shown in my co-pending application for United States Letters Patent filed October 7, 1913, bearing Serial Number 793,866.

Another object is to provide a molding machine in which the cover and the closure for an opening therein may be formed on the same apparatus by suitable attachments.

Another object is to provide means in a molding machine of the above character for adjustably supporting a pallet in the mold and means by which the pallet and molded cover may be elevated to facilitate the removal thereof from the machine.

Another object is to provide means for counter-balancing the pallet and the molded cover so that they may be readily withdrawn from the mold.

The invention primarily resides in a frame having a mold box thereon, a pallet carrying plate within the mold box, manually operated means for raising and lowering the plate including a counter-weight, a core in the mold box for forming an opening in the molded cover, and means for molding a lid for the opening in the cover.

In the drawings accompanying this specification, Figure 1 is a perspective view of the molding machine, showing it in readiness to receive the pallet and plastic mixture to form the cover. Fig. 2 is a perspective view of a ring adapted to be mounted on the core in the mold box to form a counter-sunk portion in the cover around the opening therein. Fig. 3 is a detail in perspective of a bar adapted to be connected to the machine to form a key-slot in the lid of the cover. Fig. 4 is a perspective view of the pallet for carrying the lid. Fig. 5 is a perspective view of the attachment of the machine for supporting the pallet shown in Fig. 4. Fig. 6 is a perspective view of the pallet for carrying the cover. Fig. 7 is a perspective view of the cover, showing the opening therein. Fig. 8 is a perspective view of the lid for closing the opening in the cover. Fig. 9 is a longitudinal vertical section of the machine illustrating the manner of molding the cover. Fig. 10 is a transverse section showing the manner of molding the lid for the cover. Fig. 11 is a detail in section showing the manner of adjustably supporting the cover carrying pallet.

More specifically, 12 indicates a table supported on standards 14 on a bed-plate 15; the table 12 carrying a rectangular frame 16 in which is a mold comprising a substantially rectangular metallic mold member 17 open at the top and bottom and formed with inclined side walls rounded at the corners, the lower edge of the mold member 17 being supported by the table 12. The mold member 17 is provided for the purpose of molding the tapered sides of the cover.

Mounted within the space inclosed by the mold member 17 is a plate 18 attached to the upper end of a vertically disposed tube 19 extending through an opening 20 in the table 12, which tube is designed to be reciprocated vertically and is guided by means of parallel brackets 21 carried by the tube 19 and extending on opposite sides of a pair of the standards 14 arranged in transverse alinement with the tube 19. A pair of the brackets 21 is disposed intermediate the ends of the tube 19 and another pair is arranged at its lower end.

Connecting with the lower end of the tube is a sprocket chain 22, which passes up and over a sprocket wheel 23 on a shaft 24 fitted with a hand-crank 25 and extending downward from the sprocket wheel 23 connects with a counter-weight 26 slidably mounted on one of the standards 14. Mounted in the corners of the plate 18 are bolts 27 which form supports for the plate on the table 12 and are adjusted in the plate 18 so that the corners of the plate will be equally supported. Mounted on the upper face of the table 12 is a tapered cylindrical core 28 which extends to a point slightly above the upper edge of the mold member 17 through a perforation 29 in the plate 18. Mounted in the corners of the plate 18 are screws 30 which form supports for the edge of a pallet 31 conforming in outline to the interior of the mold member 17 and having an off-set flange 32 around its marginal edge and formed with an opening 33 to receive the core 28.

In molding the cover 35 shown in Fig. 7 the plate 18 is disposed in its lowermost position with the bolts 27 resting on the top of the table 12 and the pallet 31 is placed thereon with its underside resting on the screws 30 which are adjusted to compensate for any irregularities of the pallet so as to form a rigid support for its corners. After the pallet 31 is in position a ring 34, having a downwardly converging outer edge is placed over the core 28 and supported thereby, as shown in Fig. 9; the bottom edge of the ring 34 being spaced a short distance above the upper face of the pallet 31. The plastic material, preferably concrete, of which the cover 35 shown in Fig. 7, is formed, is then poured in the mold formed by the mold member 17 and the pallet 31; the pallet 31 forming the bottom of the mold. This plastic material is suitably tamped and leveled off flush with the upper edge of the mold member 17. The table 12 is then elevated by rotating the crank 25 to cause the sprocket wheel 23 to advance the chain 22 and thereby exert an upward pull on the tube 19, thereby moving the latter in a vertical direction. The counter-weight will exert a downward pull on the outer end of the chain 22, thereby maintaining the latter taut and assisting in the elevation of the plate 18 and its load.

When the plate 18 has been moved into the position indicated in dotted lines in Fig. 9 it will be disposed above the upper edge of the mold member 17 and clear of the core 28 so that the pallet 31 carrying the molded cover thereon may be readily removed and placed on drying racks where the plastic material thereon will be allowed to harden.

The plate 18 will be held in its uppermost position by means of a spring rod 13 disposed adjacent one of the side standards 14 and secured to the bed-plate 15, the upper end of the spring rod 13 normally bearing against the standard 14 in the path of travel of the upper brackets 21 on the tube 19 in such manner that when the bracket 21 passes above the spring rod 13 the upper end of the latter will engage the underside of the bracket 21 and form a support for the latter to retain the plate 18 on the tube 19 in its uppermost position. The spring rod 13 is manually disengaged from the bracket 21 when it is desired to lower the plate 18.

The ring 34 is removed either before or after the plate 18 is elevated. The core 28 acts to form a circular opening 36 in the cover 35; the ring 33 forming a depression or counter-sunk portion 37 around the opening 36. The plate 18 is now lowered to its position on the table 12 and a new pallet 31 placed thereon if it is desired to repeat the operation and mold another cover 35. After the required number of covers have been thus molded a plate 38 hinged to one side of the frame 16 and normally disposed to one side thereon clear of the mold, as shown in Fig. 1, is then turned on its hinges 39 to extend over the mold and rest on the upper edge thereof, as shown in Fig. 10; the plate 38 being rigidly secured in this position by means of a clasp 40 thereon engaging a keeper 42 on the opposite side of the frame 16. Before the plate 38 is thus positioned a tubular extension 43, particularly shown in Fig. 5, is threaded in a flange 44 on the upper face of the plate 18, this extension 43 having an annular flange 45 on its upper edge which will extend immediately below a circular opening 46 formed in the plate 38.

The flange 45 and opening 46 are designed to receive a circular pallet 47, shown in Fig. 4, which pallet forms the bottom of a circular mold box 48 carried by the plate 38, which mold box has an internal diameter at its lower portion slightly larger than the flange 45 and pallet 47 to receive the latter; this portion of the mold box being also slightly smaller than the lower portion of the opening 36 in the cover 35.

The upper portion of the mold box 48 is increased in diameter to approximately the diameter of the ring 34 so that when plastic material is poured therein a lid 49, shown in Fig. 8, will be molded therein. For the purpose of forming a rounded upper edge on the lid 49 a ring 50 having a beveled inner face 51 is placed on the upper edge of the mold box 48, as shown in Fig. 10.

Means are provided for forming a keyway or opening through the lid 49 at the time of molding, which means consists of a rectangular bar 52 which is introduced through the tube 19 and the extension 43, and its lower end detachably secured at 53 to a lug 54 carried on the bed-plate 15. The upper end of the bar 52 extends to a point adjacent the upper edge of the mold box 48 through an opening 55 in the pallet 47. When the lid 49 has been molded the plate 18 is raised by means of the crank 25 and counter-weight 26, as before described; the plate being automatically engaged by a spring pressed pawl 56 on the plate 38 to retain the plate 18 in its uppermost position during the removal of the pallet 47 and the lid 49 thereon.

The pawl 56 is manually disengaged from the plate 18 when it is desired to restore the latter to its lowermost position. The lid 49 formed in the mold box 48 will be shaped to correspond with the opening 36 in the cover 35 and will have an enlarged upper portion which will rest in the off-set portion 37 of the opening 36 so as to support the latter on the cover; the lower portion of the lid extending into the opening 36 to prevent its being readily displaced. A rectangular opening 57 will be formed in the lid 49 by the upper end of the bar 52 through which a suitable tool can be introduced for lifting the lid from the cover 25.

What I claim is:

A molding machine, comprising a table, a mold box, a pallet carrying plate adjustably supported on said table within said mold box, a pair of parallel supporting standards beneath said table, a depending member connected to said plate extending between and parallel with the standards, brackets on said member slidably engaging the standards, a sprocket chain connected with said member, a sprocket engaging said chain, a counterweight on said chain, means for manually rotating said sprocket to raise and lower the depending member and the pallet carrying plate, means engageable with said depending member for maintaining and supporting it in its elevated position, comprising a spring pawl disposed to engage one of said brackets and a removable pallet plate adjustably mounted on said pallet carrying plate.

In witness that I claim the foregoing I have hereunto subscribed my name this 23rd day of December, 1913.

LEO G. HAASE.

Witnesses:
 EDMUND A. STRAUSE,
 MARIE BATTEY.

Copies of this patent may be obtained for five cents each, by addressing the "Commissioner of Patents, Washington, D. C."